(12) United States Patent
Tucker

(10) Patent No.: US 6,367,136 B1
(45) Date of Patent: Apr. 9, 2002

(54) TAPER-BORING MACHINE

(76) Inventor: Solomon Joel Tucker, 14 Ingwe Road, Sebenza, Edendale 1609 (ZA)

( * ) Notice: Subject to any disclaimer, the term of this patent is extended or adjusted under 35 U.S.C. 154(b) by 0 days.

(21) Appl. No.: 09/463,815
(22) PCT Filed: Jul. 31, 1998
(86) PCT No.: PCT/GB98/02310
§ 371 Date: May 2, 2000
§ 102(e) Date: May 2, 2000
(87) PCT Pub. No.: WO99/06168
PCT Pub. Date: Feb. 11, 1999

(30) Foreign Application Priority Data

Jul. 31, 1997 (ZA) .............................. 97/6849

(51) Int. Cl.[7] .............................. B23P 19/00; B23C 3/12
(52) U.S. Cl. ........................ 29/33.7; 409/138; 409/165
(58) Field of Search ................................ 409/165, 166, 409/199, 179, 138, 140; 29/33.7, 33.4; 451/232; 82/101

(56) References Cited

U.S. PATENT DOCUMENTS

| | | | |
|---|---|---|---|
| 2,917,976 A | 12/1959 | Stovall | |
| 4,216,628 A | * 8/1980 | Wada | 451/232 |
| 4,813,114 A | * 3/1989 | Walker | 29/33.7 |
| 5,027,681 A | * 7/1991 | Hyvarinen | 82/101 |
| 5,148,587 A | * 9/1992 | Phelps | 29/33.7 |
| 5,564,871 A | * 10/1996 | Lagsdin | 409/138 |
| 6,146,067 A | * 11/2000 | Owens | 409/179 |

FOREIGN PATENT DOCUMENTS

| | | | | |
|---|---|---|---|---|
| BE | 563476 | * | 1/1958 | 82/101 |
| BE | 563 476 | | 1/1958 | |
| DE | 23 05 633 | | 8/1974 | |
| DE | 2305633 | * | 8/1974 | 82/101 |
| JP | 63-93501 | * | 4/1988 | 29/33.7 |

* cited by examiner

Primary Examiner—William Briggs
(74) Attorney, Agent, or Firm—Renner, Otto, Boisselle & Sklar, LLP

(57) ABSTRACT

An apparatus for taper-boring a bevelled surface (16) into an inner wall of a pipe fitting (10, 32). The apparatus comprising support means, in the form of rollers (24, 26, 28), for supporting the fitting on the apparatus; drive means for rotating the fitting wit respect to the apparatus and a rotatable milling head (40) located at least partially within the fitting being supported by the support means. The arrangement of the support means and the milling head is such that the fitting is rotatable with respect to the milling head.

12 Claims, 1 Drawing Sheet

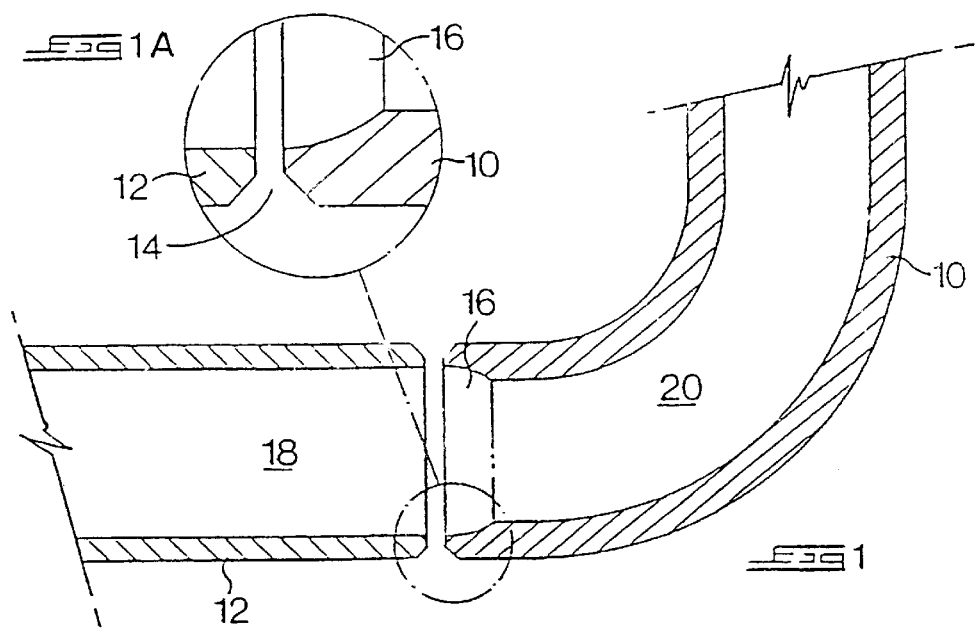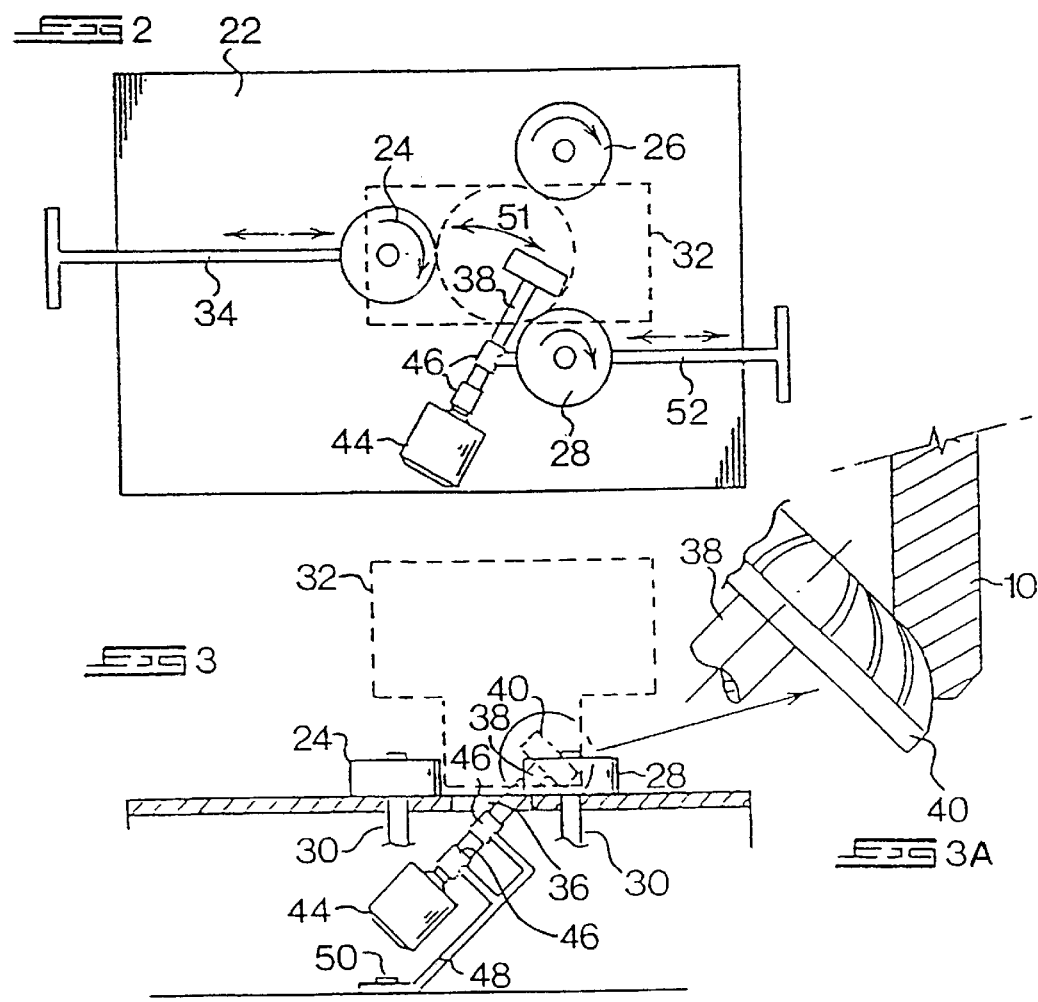

TAPER-BORING MACHINE

BACKGROUND OF THE INVENTION

This invention relates to a taper-boring machine for taper-boring an inner surface of a pipe fitting.

Throughout this specification the term "pipe fitting" refers to fittings and connectors such as elbows of varying angles, T-pieces, reducers flanges and the like.

In instances where a thicker walled fitting is welded to a thinner walled pipe, the inner wall of the fitting adjacent to the weld is taper-bored before the fitting is welded to the pipe. If this were not done a step would exist at the interface between the pipe and the fitting due to the different wall thicknesses of the pipe and the fitting. This step would increase the turbulence of a fluid flowing through the pipe and the fitting, thereby increasing friction losses.

Conventionally, a fitting is taper-bored using a circular boring machine which is inserted into the end of the fitting. A problem which exists with taper-boring fittings in this way is that the boring machine must be concentrically placed otherwise an asymmetric bevelled edge is created on the fitting. Furthermore, the boring machine can only be used in fittings which have been circular cross-section and it cannot be used in fittings which have been distorted through use, manufacturing defects or damage in transit.

SUMMARY OF THE INVENTION

According to the invention there is provided an apparatus for taper-boring a bevelled surface into an inner wall of a pipe fitting, the apparatus comprising:

support means for supporting the fitting on the apparatus;
   drive means for rotating the fitting with respect to the apparatus;
   a rotatable milling head locatable at least partially within the fitting on the fitting being supported by the support means,
the arrangement of the support means and the milling head being such that the fitting is rotatable with respect to the milling head.

Preferably, the milling head is moveable, more particularly pivotable, with respect to a fitting supported by the support means.

The support means may comprise at least three rotatable rollers displaced from one another in a triangular arrangement and defining a space between the rollers in which a fitting is supportable.

Typically, the drive means is provided on one of the three rollers.

Preferably, at least one of the rollers is moveable with respect to the other rollers so as to allow different sized fittings to be accommodated in the space between the rollers.

An embodiment of the invention is described in detail in the following passages of the specification which refer to the accompanying drawings. The drawings, however, are merely illustrative of how the invention might be put into effect, so that the specific form and arrangement of the features shown is not to be understood as limiting on the invention.

BRIEF DESCRIPTION OF THE ACCOMPANYING DRAWINGS

FIG. 1 is a cross-section through an elbow fitting adjacent to the end of a pipe, the elbow fitting having been taper-bored;

FIG. 1A is an enlargement of the circled portion of FIG. 1;

FIG. 2 is a diagrammatic plan view of a taper-boring machine according to the invention; and FIG. 3 is a diagrammatic side view of the taper-boring machine depicted in FIG. 2.

FIG. 3A is an enlargement of the circled portion of FIG. 3.

DETAILED DESCRIPTION OF AN EMBODIMENT

FIG. 1 illustrates a cross-sectional side view through an elbow fitting 10 adjacent to a pipe 12, the elbow fitting having been taper-bored making it suitable for connection to the pipe. As can be seen from FIG. 1, the wall of the elbow fitting 10 is thicker than the wall of the pipe 12. Referring specifically to the magnified section of FIG. 1, it can be seen that the outer edges of the ends of the elbow fitting 10 and the pipe 12 are chamfered such that on the fitting and the pipe being joined together they define a V-shaped channel around the outer circumference of the interface between the fitting and the pipe. This channel is used in the butt-welding of the fitting to the pipe.

As can also be seen from the magnified section of FIG. 1, the inner wall of the fitting 10 is taper-bored to form a chamfered or bevelled surface between the differing inner diameters of the pipe 18 and the conduit 20. As has already been described in the background to this specification this chamfering of the surface reduces the turbulence created.

This invention relates to the taper-boring machine used in creating the chamfered surface 16 on the inner wall at the end of the fitting 10. An embodiment of such a machine is depicted diagrammatically in FIGS. 2 and 3 of the accompanying drawings. Referring to FIG. 2, the machine comprises a bed 22 on which is mounted three rollers 24, 26 and 28. Each of the rollers has an impact-resistant polyurethane outer skin and is mounted on its own rotatable shaft 30 depicted in FIG. 3. The three rollers are spaced apart from one another to define a space in which a circular fitting can be held. In FIGS. 2 and 3 a T-shaped fitting 32 is depicted in dashed outline with the circumferential surface of one of the arms of the T-shaped fitting being held between the three rollers. The shaft of roller 24 is mounted on a lead screw 34 allowing the roller to be moved towards and away from the other two rollers 26 and 28 thereby allowing fittings having differing diameters to be accommodated between the rollers.

Extending through an opening 36 in the bed is a shaft 38 on which is mounted a milling cutter. The milling cutter 40 is orientated at an angle with respect to the horizontal. A motor 44 is provided in the machine to drive the shaft 38 and the milling head 40. Bearings 46 are provided on the shaft for supporting the shaft. The bearings 46 are connected to an arm 48 which is pivotably connected to the machine about pivot point 50 which allows the arm 48 to move through arc 51. An adjustment mechanism 52 is provided in order to pivot the shaft 38 and thereby the milling head 40 in a horizontal plane with respect to the fitting.

Once a fitting has been secured between the rollers the milling head 40 is pivoted sideway towards and into contact with the inner wall of the fitting as can be seen in the magnified section of FIG. 3. The milling cutter is rotating rapidly and on engaging with the inner face of the wall cuts into this face, as can also be seen in the magnified section of FIG. 3. Simultaneously the fitting is rotated slowly between the rollers 24, 26 and 28 thereby creating the chamfered surface around the end of the inner wall of the fitting.

In order to rotate the fitting between the rollers rollers 26 and 28 are mounted on shafts on which toothed gears are provided. This is not depicted in the accompanying drawings. A chain extends around these tooth gears and around the toothed gear of a reduction gearbox. The reduction gearbox is connected to a drive motor which drives the chain and thereby rotates the rollers It will be appreciated that as the milling head is pivoted further towards the fitting 32 a deeper cut is created into the wall of the fitting. A number of passes past the milling head are usually required before the desired wall thickness for the fitting is achieved. On the desired chamfering of the inner surface having being achieved the milling head is moved out of engagement with the fitting and the fitting is removed from the taper-boring machine. Thereafter other openings in the fitting can also be taper-bored.

A particular advantage of the machine is that it taper bores the wall of the fitting to an even thickness around the inner circumference of the fitting irrespective of eccentricity of the shape of the fitting.

What is claimed is:

1. An apparatus for taper-boring a bevelled surface into an inner wall or a pipe fitting, the apparatus comprising:

a support for supporting the fitting on the apparatus;

a drive for rotating the fitting with respect to the apparatus;

a rotatable milling head located at least partially within the fitting that is being supported by the support;

the arrangement of the support and the milling head being such that the fitting is rotatable with respect to the milling head, and the support comprising at least three rotatable rollers displaced from one another in a triangular arrangement and defining a space between the rollers in which the fitting is supportable.

2. An apparatus according to claim 1, wherein the milling head is moveable with respect to a fitting that is being supported by the support.

3. An apparatus according to claim 1, wherein the milling head is pivotable with respect to a fitting that is being supported by the support.

4. An apparatus according to claim 2, wherein at least one of the rollers is moveable with respect to the other rollers so as to allow different sized fittings to be accommodated in the space between the rollers.

5. An apparatus according to claim 1, wherein the drive is provided on one of the three rollers.

6. An apparatus according to claim 1, wherein at least one of the rollers is moveable with respect to the other rollers so as to allow different sized fittings to be accommodated in the space between the rollers.

7. An apparatus according to claim 2, wherein the drive is provided on one of the three rollers.

8. An apparatus according to claim 7, wherein at least one of the rollers is moveable with respect to the other rollers so as to allow different sized fittings to be accommodated in the space between the rollers.

9. An apparatus according to claim 5, wherein at least one of the rollers is moveable with respect to the other rollers so as to allow different sized fittings to be accommodated in the space between the rollers.

10. An apparatus according to claim 3, wherein the drive is provided on one of the three rollers.

11. An apparatus according to claim 3, wherein at least one of the rollers is moveable with respect to the other rollers so as to allow different sized fittings to be accommodated in the space between the rollers.

12. An apparatus according to claim 10, wherein at least one of the rollers is moveable with respect to the other rollers so as to allow different sized fittings to be accommodated in the space between the rollers.

* * * * *